United States Patent
Marcell (10) Patent No.: US 8,322,121 B1
(45) Date of Patent: Dec. 4, 2012

(54) ELECTRIC TRIMMER ATTACHMENT FOR LAWN TRACTORS

(76) Inventor: Roland J. Marcell, Kingsford, MI (US)

( * ) Notice: Subject to any disclaimer, the term of this patent is extended or adjusted under 35 U.S.C. 154(b) by 0 days.

(21) Appl. No.: 12/985,159

(22) Filed: Jan. 5, 2011

(51) Int. Cl.
*A01D 34/00* (2006.01)

(52) U.S. Cl. .......................................... 56/13.6; 56/12.7

(58) Field of Classification Search ................ 144/335, 144/336, 24.12, 34.1; 56/12.7, 14.9, 13.6, 56/13.7, 16.9, 14.7, 15.3, 15.9, 17.1, 16.7; 30/276
See application file for complete search history.

(56) References Cited

U.S. PATENT DOCUMENTS

| | | | |
|---|---|---|---|
| 3,782,085 A | 1/1974 | Parker et al. | |
| 4,170,099 A | 10/1979 | Owens | |
| 5,035,107 A | 7/1991 | Scarborough | |
| 5,167,108 A | 12/1992 | Bird | |
| 5,561,969 A * | 10/1996 | Sandy | 56/13.6 |
| 5,598,689 A | 2/1997 | Bork | |
| 5,694,752 A * | 12/1997 | Warfield, III | 56/13.6 |
| 6,094,896 A | 8/2000 | Lane | |
| 6,343,461 B1 | 2/2002 | Knott | |
| 6,415,586 B1 | 7/2002 | Park | |
| 6,779,325 B1 | 8/2004 | Robillard, II | |
| 6,966,168 B1 * | 11/2005 | Kerr, Sr. | 56/12.7 |
| 6,986,238 B1 * | 1/2006 | Bloodworth | 56/12.7 |
| 7,334,387 B2 | 2/2008 | Miller | |
| 7,398,637 B1 * | 7/2008 | Sevey | 56/14.9 |
| 7,712,293 B1 * | 5/2010 | Recker | 56/14.9 |

* cited by examiner

*Primary Examiner* — Robert Pezzuto
(74) *Attorney, Agent, or Firm* — Montgomery Patent & Design LLC; Robert C. Montgomery; Joseph Yaksich (57) ABSTRACT

An electric trimmer attachment for lawn tractors comprises an attachable apparatus for use with existing lawn tractors which provides trimmer capabilities. The apparatus comprises a mounting bracket, an arm, and a line trimmer. The mounting bracket provides a means for removably securing the device to a deck of an existing mower. The arm comprises a gooseneck arm attached to the bracket, which extends outwards. An outside end portion of the arm comprises a line trimmer with an electric motor and features such as automatic line advancement and safety controls. The motor is powered via a converter or battery pack on the mower. The arm provides an arc-shaped rotating motion to the trimmer.

20 Claims, 6 Drawing Sheets

ELECTRIC TRIMMER ATTACHMENT FOR LAWN TRACTORS

RELATED APPLICATIONS

The present invention was first described in a notarized Official Record of Invention on Jan. 14, 2010, that is on file at the offices of Montgomery Patent and Design, LLC, the entire disclosures of which are incorporated herein by reference.

FIELD OF THE INVENTION

The present invention relates generally to riding lawn mowers, and in particular, to a trimmer type attachment for such lawn mowers.

BACKGROUND OF THE INVENTION

Many people spend countless hours maintaining and beautifying their lawns and landscape. As a matter of pride and personal expression, these people manicure their grass and often plant and maintain flowers, shrubs, bushes, and trees all for the sake of enhancing the aesthetic qualities of their property. On properties with large areas of grass to cut, riding mowers are very popular. They allow their users to cut relatively large areas of grass in a minimal amount of time while allowing the rider to sit in comfort.

One (1) problem associated with riding mowers is that, due to their size, they are not very adept at cutting close to objects such as fences, buildings, trees and the like. This usually requires the user to go back afterwards with a string type trimmer This, in turn, negates the riding mower benefits of being able to sit down and save time. Accordingly, there exists a need for a means by which grass trimming duties can be accomplished at the same time grass is being cut by a conventional riding mower.

Various attempts have been made to provide trimmer attachments for riding mowers. Examples of these attempts can be seen by reference to several U.S. patents, including U.S. Pat. Nos. 3,782,085; 5,035,107; 5,598,689; 6,094,896; 6,343,461; 6,779,325; and 6,986,238. However, none of these designs are similar to the present invention.

While these devices fulfill their respective, particular objectives, each of these references suffer from one (1) or more of the aforementioned disadvantages. Many such devices are not universally mountable for a variety of mower models. Also, many such devices do not provide a full range of desirable adjustability and manipulation of the trimmer head position during use. Furthermore, many such devices are not readily operated and manipulated by a lawn mower rider from their seated position. In addition, many such devices do not include a simple, renewable power source. Accordingly, there exists a need for an electric trimmer attachment for lawn mowers without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an electric trimmer attachment for lawn mowers which is universally attachable and adjustable while providing a simple means for powering and operating the trimmer attachment while riding the lawn mower. Thus, the object of the present invention is to solve the aforementioned disadvantages and provide for this need.

To achieve the above objectives, it is an object of the present invention to provide an electrically operated trimmer attachment mountable to a rider-based grass cutting device. The apparatus comprises an electric cutting head, a guide arm, and a caster. The cutting head comprises a trimmer type cutting assembly including an automatically advancing string cutter. The guide arm supports the cutting head and the caster facilitates motioning of the guide arm and cutting head along a ground surface.

Another object of the present invention is to attach to a mowing deck surface of a riding style lawn mower. The apparatus comprises a mounting bracket attached to the deck surface with a plurality of fasteners. The mounting bracket is connected to a vertical support pole which further supports a positioning mechanism attached to a main support arm. The main support arm attaches to the cutting head and allows a user to control the position of the cutting head.

Yet still another object of the present invention is to allow the user to manipulate and operate the apparatus while seated in a seat of the lawn mower. The main support arm attached to the positioning mechanism extends from the cutting head at a lower end upwards towards the seat and further comprises an operating handle adapted for ergonomic gripping by the user.

Yet still another object of the present invention is to allow a user to control rotational motion of the cutting head by motioning the operating handle. The handle and guide arm attach to the positioning mechanism which comprises a plurality of housing sections attached to the vertical support pole. A middle housing structure of the positioning mechanism is rotatable with respect to the support pole.

Yet still another object of the present invention is to allow a user to selectively lock and secure the main support arm in a plurality of discrete positions with a locking pin and a plurality of keyed slots.

Yet still another object of the present invention is to facilitate use of the trimmer attachment in a conventional manner by the user while seated in the riding mower and while the riding mower is turned off or otherwise not moving.

Yet still another object of the present invention is to provide electrical power to the apparatus by a connection cable and electrical power connector which draw electrical power from the riding mower.

Yet still another object of the present invention is to allow a user to quickly disconnect the electrical power connector from the riding mower as needed.

Yet still another object of the present invention is to prevent unauthorized or unintentional operation of the apparatus by including a keyed ignition switch.

Yet still another object of the present invention is to ensure safety of the user by comprising a seat occupancy verification switch which automatically cuts power to the apparatus if the user is not seated in the riding mower.

Yet still another object of the present invention is to allow a user to selectively control the supply of power to the apparatus while seated with a dash-mounted switch. The dash-mounted switch allows the user to cut the electrical power supply to the apparatus when the apparatus is not being utilized.

Yet still another object of the present invention is to provide a method of utilizing the device that provides a unique means of obtaining an instance of the apparatus, attaching the apparatus to the mower deck of the riding mower with the mounting bracket, connecting the electrical power connector to a battery of the riding mower, sitting in the seat of the riding mower, operating the riding mower in a conventional manner, utilizing the operating handle to manipulate the position of the cutting head from the seat when the riding mower is stopped, utilizing the dash-mounted switch to activate the blades of the cutting head to provide a trimming function while the riding mower is stopped, locking the position of the cutting head as desired using the locking pin and the plurality of keyed slots, and continuing to utilize the riding mower and trimmer attachment in conjunction until a desired lawn maintenance task is complete.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | electrically-operated trimmer apparatus for rider-based grass cutting means |
| 15 | trimmer apparatus |
| 20 | rider-based grass cutting device |
| 25 | lawn cutting apparatus |
| 30 | cutting head |
| 31 | lip |
| 35 | guide arm |
| 40 | caster |
| 41 | fastener |
| 45 | self-advancing string cutter |
| 50 | main support arm |
| 51 | secondary support arm |
| 52 | main support aperture |
| 53 | secondary support aperture |
| 54 | pin |
| 55 | positioning mechanism |
| 60 | handle |
| 65 | cable trigger |
| 66 | pivot point |
| 67 | trigger aperture |
| 68 | attachment knot |
| 70 | user |
| 75 | seat |
| 80 | vertical support pole |

-continued

| DESCRIPTIVE KEY | |
|---|---|
| 81 | upper spacer |
| 82 | lower spacer |
| 85 | mowing deck surface |
| 90 | mounting bracket |
| 95 | first fastening system |
| 100 | connection cable |
| 105 | vegetation |
| 110 | cutting path arc |
| 115 | lower housing structure |
| 116 | spool assembly |
| 120 | middle housing structure |
| 125 | upper housing structure |
| 130 | lower bearing raceway |
| 135 | upper bearing raceway |
| 145 | cover cap |
| 150 | upper control arm |
| 155 | azimuth control wheel |
| 160 | keyed slots |
| 165 | locking pin |
| 166 | pin guide |
| 170 | control cable |
| 175 | linear spring |
| 176a | upper guard |
| 176b | lower guard |
| 177a | upper shaft |
| 177b | lower shaft |
| 178 | anti-rotation pin |
| 179 | spring |
| 180 | fastening hardware |
| 185 | electrical power connector |
| 190 | upper support surface |
| 195 | lower support surface |
| 200 | upper washer |
| 205 | upper nut |
| 210 | lower washer |
| 215 | lower nut |
| 220 | battery |
| 225 | keyed ignition switch |
| 230 | seat occupancy verification switch |
| 235 | transformer |
| 240 | overcurrent protective device |
| 245 | dash-mounted switch |
| 250 | motor |
| 251 | shaft |
| 252 | lock nut |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
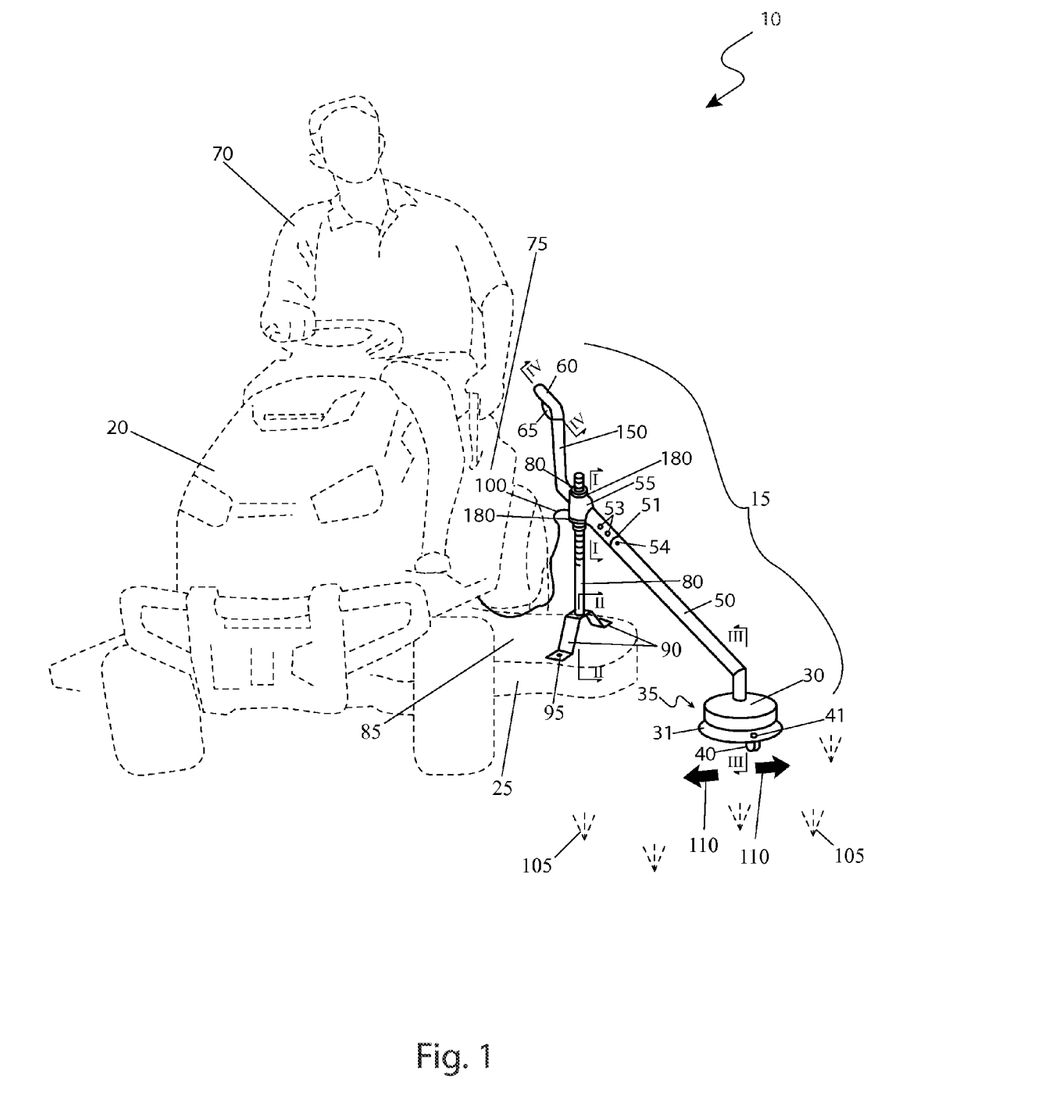
FIG. 1 is an environmental view of an electrically operated trimmer apparatus for rider-based grass cutting means 10, according to the preferred embodiment of the present invention.

Referring now to FIG. 1, an environmental view of the electrically-operated trimmer apparatus for rider-based grass cutting means 10, according to the preferred embodiment of the present invention, is disclosed. The electrically-operated trimmer apparatus for rider-based grass cutting means (herein described as the "system") 10 comprises a trimmer apparatus 15 that is mounted and electrically connected with a rider-based grass cutting device 20 such as a riding mower, a riding lawn tractor, or a riding garden tractor with a lawn cutting apparatus 25. The system 10 comprises a cutting head 30 (also see FIG. 4) that trims vegetation 105 such as grass, weeds or the like. The system 10 also comprises an operating handle 60 located at a distal end of a length adjustable secondary support arm 51 such that it can be easily reached and operated by a user 70 when positioned upon a seat 75 of the rider-based grass cutting device 20. An underside surface of the handle 60 comprises a cable trigger 65 which enables a positioning mechanism 55 to be unlocked for manipulation purposes. The positioning mechanism 55 is supported by a height adjustable vertical support pole 80 that is attached to a mowing deck surface 85 by use of a mounting bracket 90 (also see FIG. 3). Electric power for the cutting head 30 is provided by a connection cable 100, whose additional details will be described in greater detail herein below. These features allow for the system 10 to trim vegetation 105 as defined along a cutting path arc 110.

Figure 2:
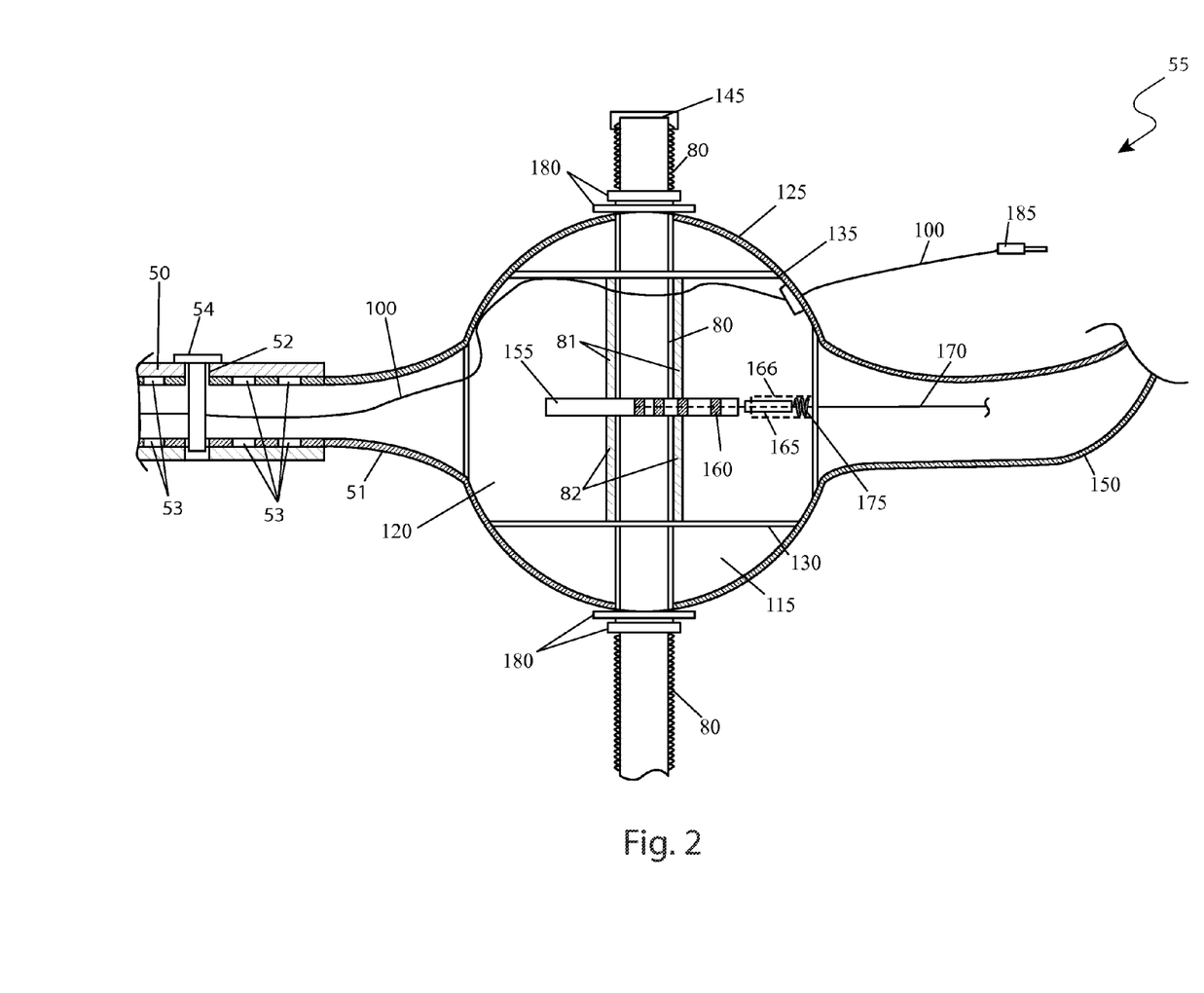
FIG. 2 is a section view of a positioning mechanism 55 taken along a line I-I (see FIG. 1), according to the preferred embodiment of the present invention.

Referring now to FIG. 2, a section view of the positioning mechanism 55 taken along a line I-I (see FIG. 1), according to the preferred embodiment of the present invention, is disclosed. The vertical support pole 80 extends from the mowing deck surface 85 and comprises a tubular body which comprises exterior threads and further includes a threaded cover cap 145 which enables access to an internal portion. The vertical support pole 80 supports said positioning mechanism 55, which further comprises a lower housing structure 115, a middle housing structure 120, and an upper housing structure 125 with the use of a lower bearing raceway 130 and an upper bearing raceway 135. As such, the lower housing structure 115 and the upper housing structure 125 remain stationary with respect to the vertical support pole 80. This allows motion input from an upper control arm 150 which attached to the positioning mechanism 55 diametrically opposite from the secondary support arm 51 and further connects to the operating handle 60 (see FIG. 1) to provide rotational input control. Said motion will then be vectored to a main support arm 50 and the cutting head 30. An upper spacer 81 is positioned between the upper bearing raceway 135 and an azimuth control wheel 155 which creates a fixed gap and gives additional stability to the positioning mechanism 55. Likewise, a lower spacer 82 is positioned between the lower bearing raceway 130 and the azimuth control wheel 155 for stability. The spacers 81, 82 encompass the vertical support pole 80 and are fabricated from a material such as rubber, yet other materials may be utilized without limiting the scope of the system 10.

These aforementioned components are held captive against the vertical support pole 80 via a set of fastening hardware 180 such as washers and nuts. The fastening hardware 180 also adjusts the vertical position of the positioning mechanism 55 upon the vertical support pole 80. By loosening the fastening hardware 180 the positioning mechanism 55 is able to be slidably positioned to a desired height with respect to the user 70 upon the vertical support pole 80 and by subsequently tightening said fastening hardware 180 into the desired position said positioning mechanism 55 is fixed into the desired position.

The specific position of the secondary support arm 51 can be locked in place via a lower housing structure 115 which is physically affixed to the vertical support pole 80. Such fixation is accomplished via a series of keyed slots 160 in the azimuth control wheel 155 which engage a locking pin 165. This locking pin 165 can be withdrawn to allow for freedom of movement via the cable trigger 65 which is connected to a control cable 170 working against a linear spring 175. The locking pin 165 is directed through a pin guide 166 which is further attached to an internal wall for stability. The pin guide 166 also houses the linear spring 175 which is attached to the locking pin 165 on a distal end and attached to the control cable 170 on an opposing proximal end.

The support arms 50, 51 are also telescopingly adjustable which provides a length adjustment means to the system 10. The main support arm 50 comprises a diameter slightly larger than the secondary support arm 51 and enables said main support arm 50 to slidably engage said secondary support arm 51. The main support arm 50 comprises a main support aperture 52 and the secondary support arm comprises a plurality of corresponding secondary support apertures 53. The user 70 may align the apertures 52, 53 and insert a pin 54 which is preferably a common detent pin or a cotter pin to lock the support arms 50, 51 into a desired position.

Finally, the connection cable 100 is routed through the middle housing structure 120 and down the support arms 50, 51 to the cutting head 30. An electrical power connector 185 is provided at the end of the connection cable 100 to allow for the system 10 to be quickly disconnected from the rider-based grass cutting device 20 (also see FIG. 1) should the need arise.

Figure 3:
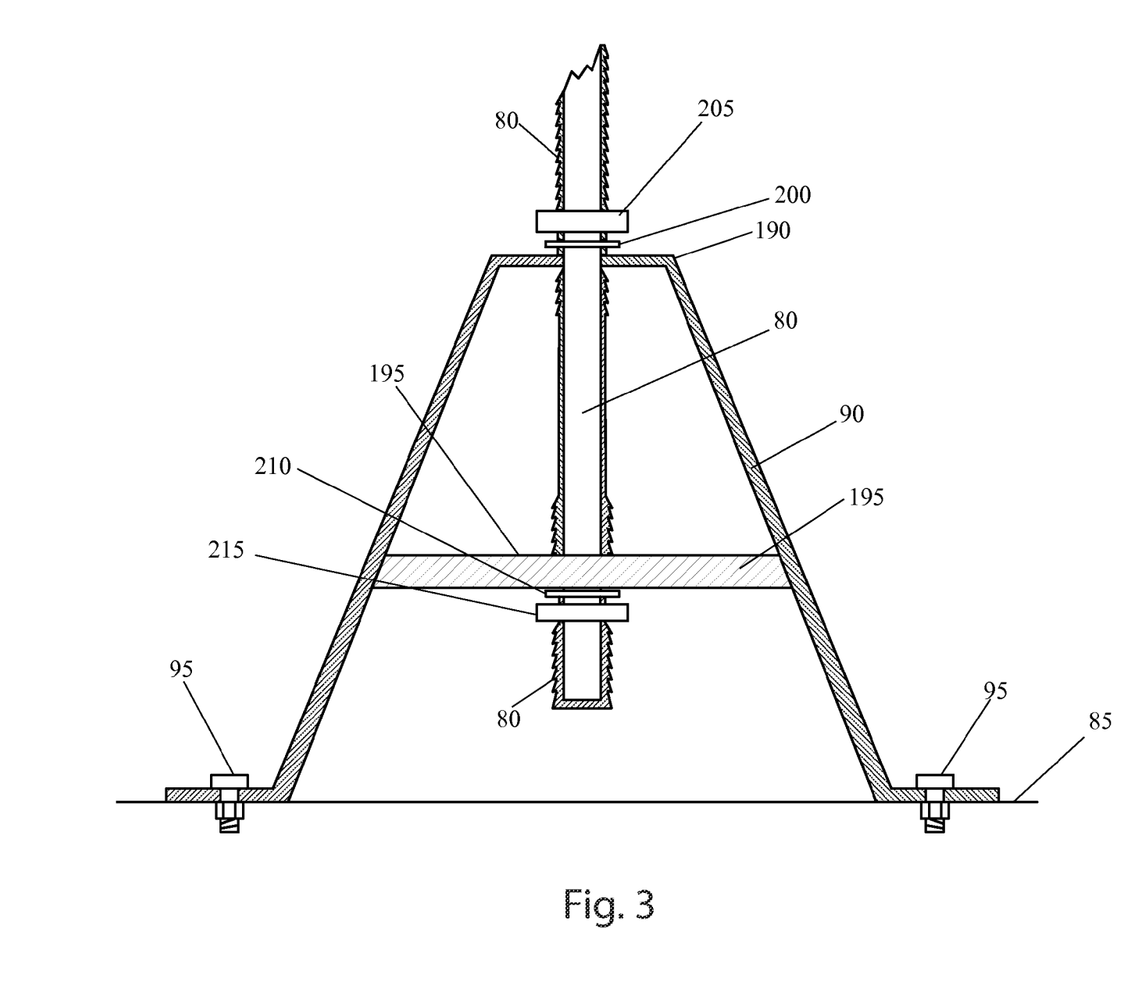
FIG. 3 is a section view of a mounting bracket 90 taken along a line II-II (see FIG. 1), according to the preferred embodiment of the present invention.

Referring now to FIG. 3, a section view of the mounting bracket 90 taken along a line II-II (see FIG. 1), according to the preferred embodiment, is disclosed. The mounting bracket 90 is mounted against the mowing deck surface 85 via use of a pair of first fastening system 95 such as screws, washers, nuts, or the like although other fastening means such as snap fasteners, keyed locks, and the like, could be used with equal effectiveness and as such, should not be interpreted as a limiting factor of the present invention. Such a first fastening system 95 allows for removal of the system 10 from the rider-based grass cutting device 20 should it not be needed at a later time. The vertical support pole 80 penetrates an upper support surface 190 and is additionally supported by a lower support surface 195. As motion of the vertical support pole 80 is provided via the positioning mechanism 55 (as shown in FIG. 2), the vertical support pole 80 is held captive at the mounting bracket 90. Such capture is accomplished via an upper washer 200 and an upper nut 205 against the upper support surface 190, and a lower washer 210 and a lower nut 215 against the lower support surface 195. Note that the surface of the vertical support pole 80 is to be threaded at this point to accomplish such fastening.

Figure 4:
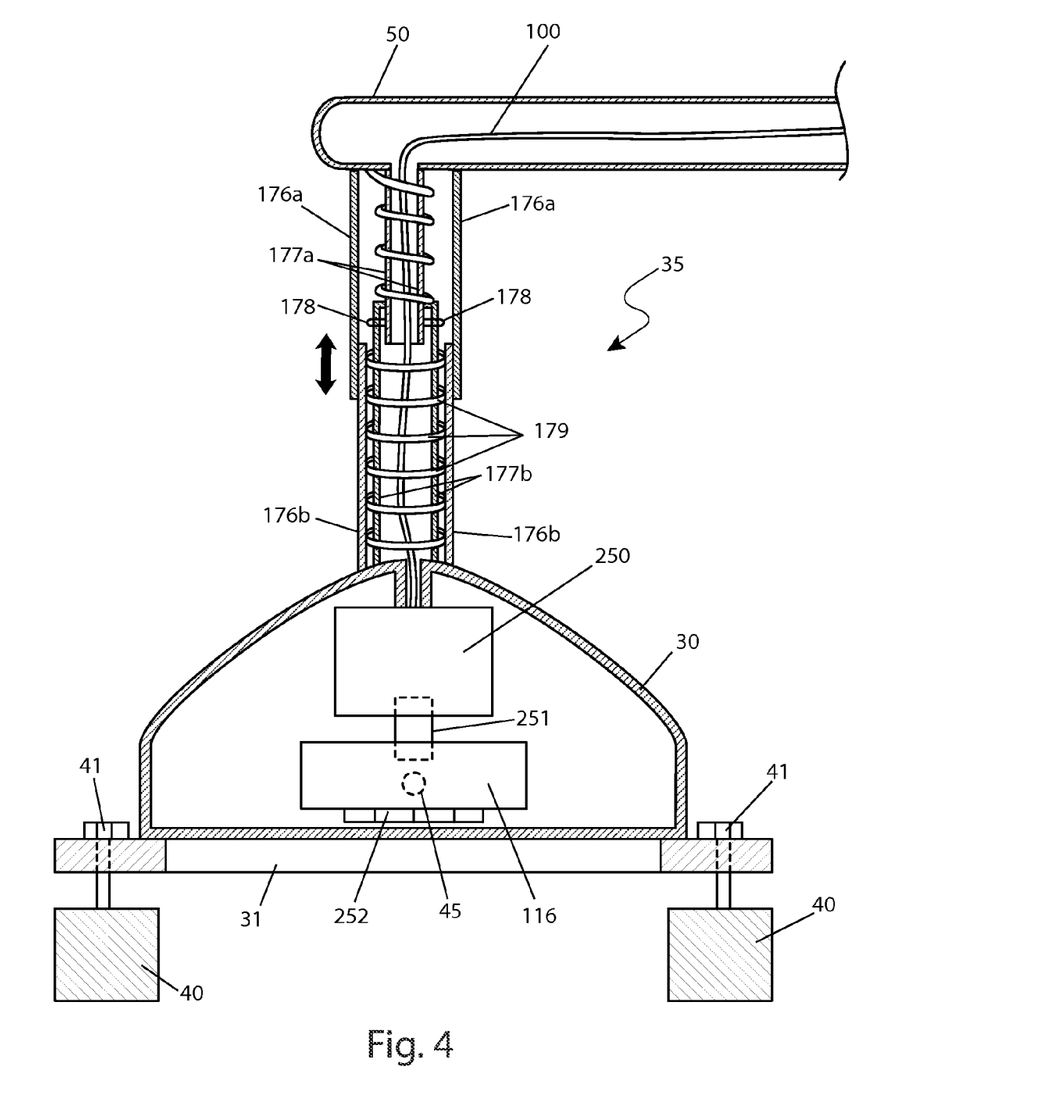
FIG. 4 is a section view of a cutting head 30 taken along line III-III (see FIG. 1), according to the preferred embodiment of the present invention.

Referring now to FIG. 4, a section view of the cutting head 30 taken along line III-III (see FIG. 1), according to the preferred embodiment of the present invention, is disclosed. The cutting head 30 provides the trimming means to the system 10 in a similar nature to those conventionally available and would be supplied with a spool assembly 116, and a motor 250. The cutting head 30 comprises a circular dome-shaped body and is fabricated from durable materials such as rubber, plastic, or the like. The cutting head 30 includes an internally positioned motor 250 which is supplied with power via the connection cable 100. The motor 250 rotates a shaft 251 which concurrently connects said motor 250 to the spool assembly 116. The spool assembly 116 is used to house the trimming line and comprises a self-advancing string cutter 45 similarly to common weed trimmers.

The cutting head 30 also comprises a guide arm 35 (see herein below) which assists said cutting head 30 while in use. A lower perimeter edge of the cutting head 30 comprises an integral lip 31 which provides an attachment surface to a pair of three-hundred-sixty degree (360°) casters 40. The casters 40 are mounted to opposing sides of the lip 31 by fasteners 41.

The casters ride along the surface of the vegetation 105 which enables the cutting head 30, along with the guide arm 35, to remain level while in use.

The guide arm 35 is positioned between the cutting head 30 and the main support arm 50. The guide arm 35 is suspended from a proximal lower surface of the main support arm 50 and comprises an upper guard 176a, a lower guard 176b, an upper shaft 177a, a lower shaft 177b, and a spring 179. The guide arm 35 provides a shock absorbing or damping means to the system 10 as said system 10 is being utilized. The guards 176a, 176b and shafts 177a, 177b comprise a tubular shape which enable the connection cable 100 to be routed from the main support arm 50 to the motor 250. The upper guard 176a is attached to a lower surface of the main support arm 50 and the lower guard 176b is attached to an upper intermediate surface of the cutting head 30. The diameter of the lower guard 176b is slightly smaller than the diameter of the upper guard 176a to enable said lower guard 176b to slidably travel within said upper guard 176a. The guards 176a, 176b eliminate debris from an internal portion of the guide arm 35. The shafts 177a, 177b are positioned within the guards 176a, 176b and are encompassed by the spring 179 which provides a recoiling means to the guide arm 35. The upper shaft 177a is also attached to a lower surface of the main support arm 50 and the lower shaft 177b is also attached to an upper intermediate surface of the cutting head 30. Likewise, the diameter of the lower shaft 177b is slightly smaller than the diameter of the upper shaft 177a to enable said lower shaft 177b to slidably travel within said upper shaft 177a. A distal outer surface of the upper shaft 177a comprises a pair of opposing anti-rotation pins 178 which engage a proximal portion of the lower shaft 177b to provide compliance with rough surfaces in the z-axis and further keep the shafts 177a, 177b centered and vertical during use.

Figure 5:
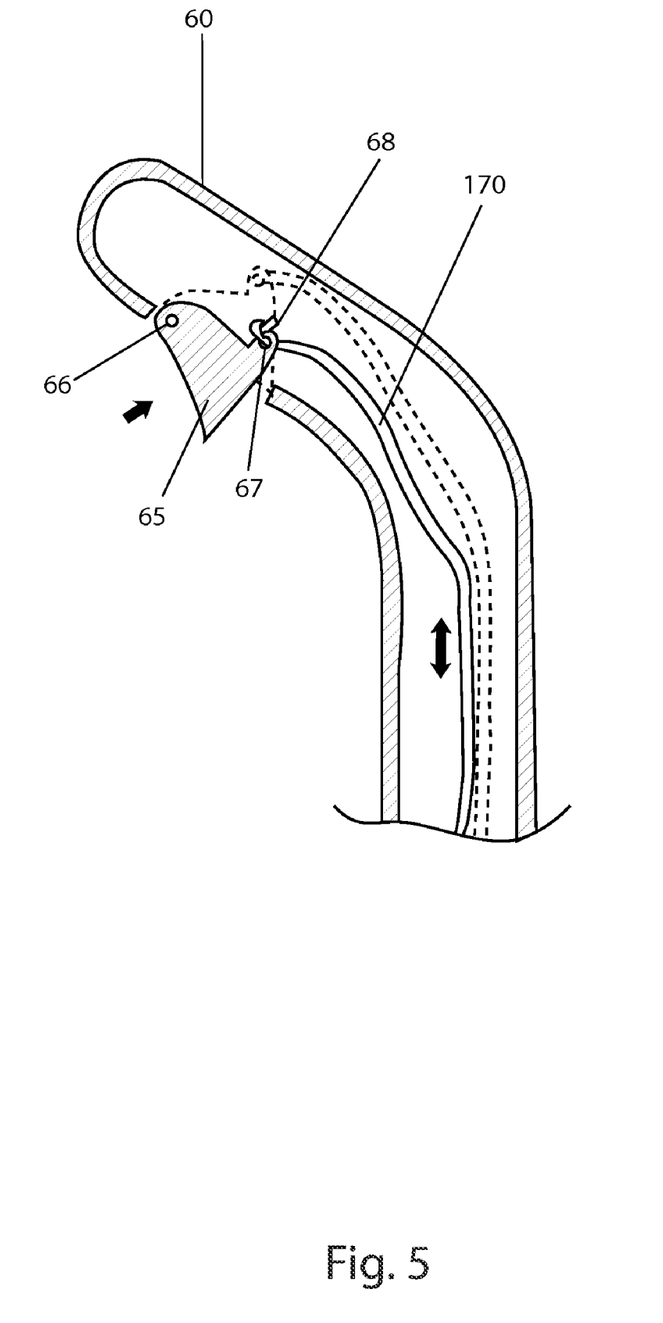
FIG. 5 is a section view of a handle 60 taken along line IV-IV (see FIG. 1), according to the preferred embodiment of the present invention; and, FIG. 6 is an electrical schematic diagram of the major electrical components as used upon the electrically operated trimmer apparatus for rider-based grass cutting means 10, according to the preferred embodiment of the present invention.

Referring now to FIG. 5, a section view of the handle 60 taken along line IV-IV (see FIG. 1), according to the preferred embodiment of the present invention, is disclosed. An underside surface of the handle 60 comprises the cable trigger 65 which enables the user 70 to manipulate the positioning mechanism 55. The cable trigger 65 pivots about a pivot point 66 by the user 70 depressing said cable trigger 65 inwards. The control cable 170 is attached with an attachment knot 68 or similar attachment means to a trigger aperture 67. As the cable trigger 65 is depressed the control cable 170 tightens which will pull the locking pin 165 out from the keyed slot 160 to further enable the user 70 to manipulate the positioning mechanism 55 as above-mentioned.

Figure 6:
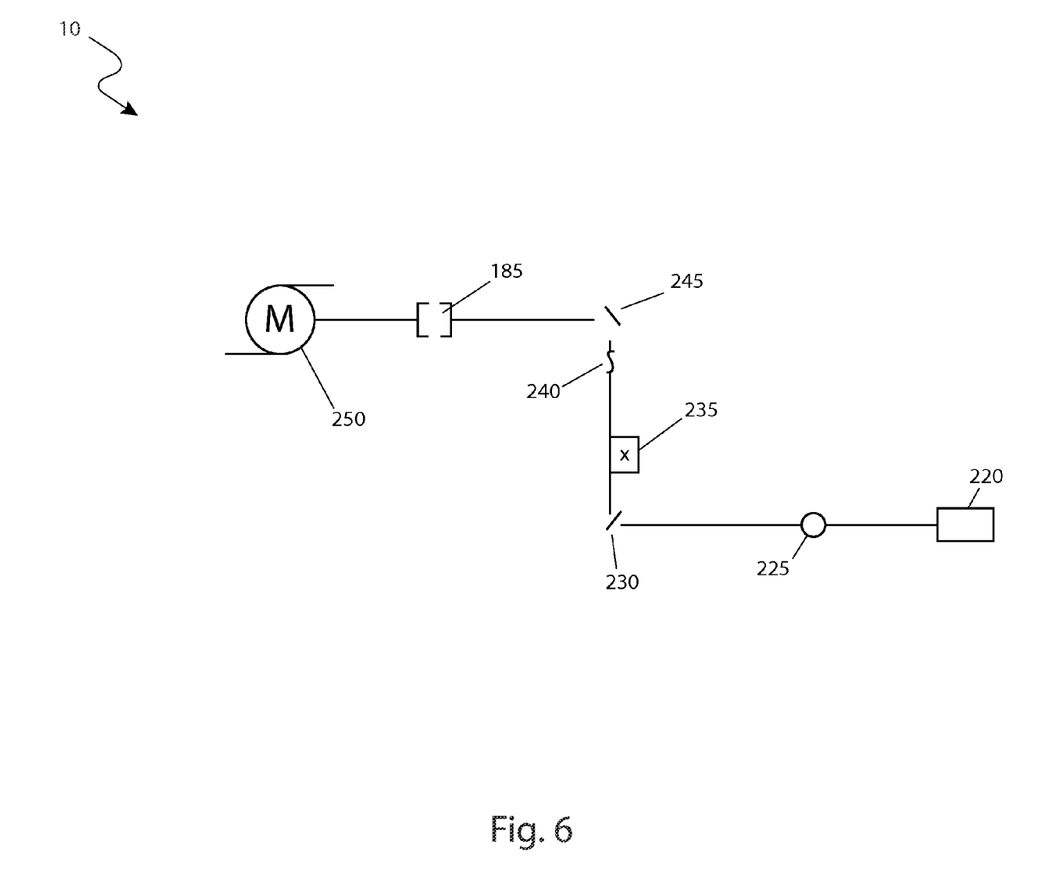

Referring now to FIG. 6, an electrical schematic diagram of the major electrical components as used upon the system 10, according to the preferred embodiment of the present invention, is disclosed. Electrical power is obtained from the battery 220 of the rider-based grass cutting device 20. Access control is provided by a keyed ignition switch 225 to prevent unauthorized or unintentional operation. Next, power control is routed through a seat occupancy verification switch 230 to ensure that the user 70 is present in the seat 75 (as shown in FIG. 1) of the rider-based grass cutting device 20. A transformer 235 is then provided, if needed, to adjust the voltage level of the battery 220 to that of the cutting head 30. The secondary output of the transformer 235 is protected via an overcurrent protective device 240 such as a fuse, circuit breaker, or the like. The last electrical element to control power flow to the system 10 is that of a dash-mounted switch 245 located on the dash area of the rider-based grass cutting device 20. The dash-mounted switch 245 allows the user 70 to control the operation of the system 10 such that it is energized only when needed. Connection to the electrical circuitry is made via the electrical power connector 185 which allows for the rapid connection and disconnection of a motor 250 associated with the cutting head 30. The aforementioned circuitry is of a series connected nature, and as such, allows great latitude in how it is constructed and configured. This operational sequence is intended to identify important control elements associated with the system 10 and the specific interconnection configuration is not intended to be a limiting factor of the present invention.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. The system 10 would be constructed in general accordance with FIG. 1 through FIG. 6. Regardless of the actual origination, the trimmer apparatus 15 would be installed via a physical mechanical connection of the mounting bracket 90 and first fastening system 95 as well as an electrical interconnection as depicted in FIG. 4. It is known that various differences would be needed to fit exact specific models of rider-based grass cutting device 20, but that overall generalities of construction and interconnection would remain the same. After the system 10 is installed both mechanically and electrically, it is ready for operation and use.

During use of the system 10, the user 70 would remain in the seat of the rider-based grass cutting device 20 and cut grass using the lawn cutting apparatus 25 in a conventional manner. Should an area be approached that requires specialize trimming, the user would stop the rider-based grass cutting device 20, but remain in a seated position. Next, the user would activate the dash mounted switch 245 with one (1) hand while holding the operating handle 60 with the other. The user would engage the cable trigger 65 on the operating handle 60 such that the cutting head 30 can be swung back and forth along a cutting path arc 110 to cut the vegetation 105. The cutting head 30 is supported in this operation by the guide arm 35 and the casters 40. The trimmer apparatus 15 could be locked in place via the locking pin 165 in the keyed slots 160 of the azimuth control wheel 155 with the cutting head 30 in an operating mode for cutting in a linear fashion by the movement of the entire rider-based grass cutting device 20. Such operation is advantageous when cutting vegetation 105 along a straight or near straight obstacle such as a fence, building, flower bed or the like.

Such operation and cutting of vegetation 105 continues until not needed anymore. At such a point in time, the system 10 is deactivated using the dash-mounted switch 245. Such operation continues in a cyclical manner until all vegetation 105 cutting and trimming is complete.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A trimmer apparatus for a lawn mower, comprising:
    a cutting assembly electrically connected to an on-board power source of said lawn mower comprising:
        a cutting mechanism supported by a frame having a pair of wheel assemblies affixed thereto;
        an electrical connection cable providing electrical communication between said motor and said power source;
        a seat occupancy verification switch adapted to be in electrical communication with an ignition switch of said on-board power source;
        a transformer in electrical communication with said seat occupancy verification switch;
        an overcurrent protective device in electrical communication with said transformer;
        a dash-mounted switch in electrical communication with said overcurrent protective device; and,
        an electrical connector for communicating electricity from said on-board power source to said electrical connection cable of said cutting assembly;
        wherein said ignition switch provides current to said cutting assembly;
        wherein said seat verification switch is activated to provide current to said cutting assembly when said operator is present within an operator seat of said lawn mower;
        wherein said transformer adjusts a voltage level of said on-board power source to a required voltage level for operation of said cutting assembly;
        wherein said overcurrent protection device protects said cutting assembly from an overcurrent condition; and,
        wherein said dash-mounted switch is located adjacent to said operator seat on a dashboard of said lawn mower and provides a selective operating means for directing current to said cutting assembly;
    a guide arm assembly attached to an upper end of said cutting assembly;
    a main support arm assembly connected at a first end to said guide arm assembly and having a positioning mechanism located at a second end;
    a support pole assembly adjustably attached to said positioning mechanism at an upper end and extending downwardly therefrom, further having a lower end removably affixed to a frame of said lawn mower; and,
    a control arm assembly adjustably attached to said positioning mechanism and extending rearwardly therefrom;
    wherein said control arm assembly extends to a location adjacent to an operator of said lawn mower such that said operator can manipulate said control arm assembly;
    wherein said support pole assembly resiliently supports said control arm assembly and said main support arm;
    wherein said control arm assembly operably controls said cutting assembly via said positioning mechanism;
    wherein said guide arm assembly provides a suspension means to said cutting assembly; and,
    wherein said pair of wheel assemblies contacts a ground surface when in operation and arcuately motions said cutting assembly when controlled by said control arm assembly.

2. The trimmer apparatus of claim 1, wherein said cutting assembly further comprises:
    a circular dome-shaped body further having a lip outwardly extending along a bottom perimeter edge;
    an internally positioned motor mounted within said body;
    a shaft operably driven by said motor; and,
    a spool assembly comprising a trimming line, said spool assembly affixed to and driven by said shaft;
    wherein said circular dome-shaped body provides a safety shroud to said motor and said spool assembly; and,
    wherein a leading edge of said trimming line extends outwardly from said cutting assembly.

3. The trimmer apparatus of claim 2, wherein said cutting assembly further comprises a self-advancing string cutter.

4. The trimmer apparatus of claim 3, wherein said pair of wheel assemblies each further comprises a 360° caster wheel affixed to said lip of said body.

5. The trimmer apparatus of claim 2, wherein said guide arm assembly further comprises:
    a tubular lower guard attached to an upper intermediate location of said circular dome-shaped body of said cutting assembly;
    a tubular upper guard attached to an lower surface of said main support arm assembly;
    a tubular lower shaft encompassed within said lower guard and further attached to said upper intermediate location of said circular dome-shaped body;
    a lower interstitial space defined between said lower shaft and said lower guard;
    a tubular upper shaft encompassed within said upper guard and further attached to said lower surface of said main support arm assembly;
    an upper interstitial space defined between said upper shaft and said upper guard;
    a spring positioned with said lower and upper interstitial space; and,
    a pair of anti-rotation pins opposingly located on a distal outer surface of said upper shaft;
    wherein said lower guard slidably travels within said upper guard;
    wherein said lower shaft slidably travels within said upper shaft; and,
    wherein said pair of anti-rotation pins engage a proximal portion of said lower shaft to provide compliance with rough surfaces and further retain said lower and upper shaft centered and vertical;
    wherein said guide arm assembly provides shock absorbing and vibration dampening means to said cutting assembly.

6. The trimmer apparatus of claim 5, wherein said main support arm assembly further comprises a length adjustment means.

7. The trimmer apparatus of claim 6, wherein said length adjustment means further comprises:
    a first support arm, having a proximal end and a distal end attached to said guide arm assembly, further comprising a main support aperture;
    a second support arm having a distal end telescopically engaging said first support arm proximal end and a proximal end attached to said positioning mechanism, further comprising a plurality of equidistantly spaced secondary apertures; and,
    an adjustment pin;
    wherein a desired length is achieved by aligning a desired one of said plurality of secondary apertures with said main support aperture; and,
    wherein said adjustment pin is routed through said desired one of said plurality of secondary apertures and said main support aperture to secure said desired length.

8. The trimmer apparatus of claim 6, wherein said control arm assembly further comprises:

an upper control arm, having a distal end attached to said positioning mechanism at a diametrically opposing location from said second support arm;

an operating handle attached to a proximal end of said upper control arm;

a cable trigger located on an underside of said operating handle, pivotally connected to said operating handle with a pivot point; and, a control cable having a proximal end attached to and operably controlled by said cable trigger and a distal end;

wherein said control cable is routed through an interior of said control arm assembly.

9. The trimmer apparatus of claim 8, wherein said support pole assembly further comprises:

a vertical support pole comprising external threads, having an upper portion and a lower portion;

a mounting bracket removably mounting said vertical support pole lower portion to said frame of said lawn mower; and, a cap removably fastened to an end of said upper portion;

wherein said vertical support pole is adjustably mounted to said positioning mechanism to a desired vertical position.

10. The trimmer apparatus of claim 9, wherein said mounting bracket further comprises:

an upper support surface, comprising a pair of mounting ears at a lower end of a pair of arms and an upper portion connecting an upper end of said pair of arms, further having a centrally disposed upper aperture;

a lower support surface spanning a distance between and affixed to an intermediate location of said pair of arms, further comprising a lower aperture vertically aligned with said upper aperture; and, a pair of first fastening systems, each removably securing said vertical support pole to said mounting bracket;

wherein said pair of first fastening systems enables removal of said trimmer apparatus from said frame of said lawn mower.

11. The trimmer apparatus of claim 9, wherein said positioning mechanism further comprises:

an upper and a lower fastener removably securing said positioning mechanism to said vertical support pole;

a lower housing structure further having a lower bearing raceway;

a middle housing structure having a first end attached to said upper control arm distal end and a second end attached to said second support arm;

an azimuth control wheel, comprising a series of keyed slots;

a pin guide located at said first end of said middle housing structure;

a linear spring affixed to an inner wall of said middle housing structure first end;

a locking pin affixed to a second end of said linear spring and traveling within said pin guide, said locking pin attached to and operably controlled by said control cable distal end;

an upper housing structure further having an upper bearing raceway;

a lower spacer positioned between said lower bearing raceway and said azimuth control wheel, thereby creating an lower fixed gap therebetween, said lower pacer contacting said vertical support pole; and, an upper spacer positioned between said upper bearing raceway and said azimuth control wheel, thereby creating an upper fixed gap therebetween, said upper spacer contacting said vertical support pole;

wherein said upper and lower fastener secures said positioning mechanism at said desired vertical position;

wherein said control cable motions said locking pin against said linear spring to engage said locking pin within a desired one of said series of keyed slots to secure said positioning mechanism at a desired position;

wherein said control arm assembly operably controls said middle housing structure, thereby transferring directional control to said main support arm assembly; and, wherein said lower bearing raceway and said upper bearing raceway enable said middle housing structure rotate relative to said support pole assembly, said upper housing structure and said lower housing structure.

12. The trimmer apparatus of claim 11, wherein said upper spacer and said lower spacer each comprise a rubber construction.

13. The trimmer apparatus of claim 9, wherein said electrical connection cable is routed through at least said guide arm, said main support arm, and said positioning mechanism.

14. A trimmer apparatus for a lawn mower, comprising:

a cutting assembly supported by a frame having a pair of wheel assemblies affixed thereto, further comprising:

a circular dome-shaped body further having a lip outwardly extending along a bottom perimeter edge;

an internally positioned motor mounted within said body;

an electrical connection cable providing electrical communication between said motor and an on-board power source of said lawn mower;

a shaft operably driven by said motor; and, a spool assembly comprising a trimming line, said spool assembly affixed to and driven by said shaft;

wherein said circular dome-shaped body provides a safety shroud to said motor and said spool assembly; and, wherein a leading edge of said trimming line extends outwardly from said cutting assembly;

an on-board control system, comprising:

a seat occupancy verification switch adapted to be in electrical communication with an ignition switch of said on-board power source;

a transformer in electrical communication with said seat occupancy verification switch;

an overcurrent protective device in electrical communication with said transformer;

a dash-mounted switch in electrical communication with said overcurrent protective device; and, an electrical connector for communicating electricity from said on-board power source of said lawn mower to said electrical connection cable of said cutting assembly;

wherein said ignition switch provides current to said cutting assembly;

wherein said seat verification switch is activated to provide current to said cutting assembly when said operator is present within an operator seat of said lawn mower;

wherein said transformer adjusts a voltage level of said on-board power source of said lawn mower to a required voltage level for operation of said cutting assembly;

wherein said overcurrent protection device protects said cutting assembly from an overcurrent condition; and, wherein said dash-mounted switch is located adjacent to said operator seat on a dashboard of said lawn mower and provides a selective operating means for directing current to said cutting assembly;
a guide arm assembly, further comprising:
   a tubular lower guard attached to an upper intermediate location of said circular dome-shaped body of said cutting assembly;
   a tubular upper guard;
   a tubular lower shaft encompassed within said lower guard and further attached to said upper intermediate location of said circular dome-shaped body;
   a lower interstitial space defined between said lower shaft and said lower guard;
   a tubular upper shaft encompassed within said upper guard;
   an upper interstitial space defined between said upper shaft and said upper guard;
   a spring positioned with said lower and upper interstitial space; and,
   a pair of anti-rotation pins opposingly located on a distal outer surface of said upper shaft;
   wherein said lower guard slidably travels within said upper guard;
   wherein said lower shaft slidably travels within said upper shaft; and,
   wherein said pair of anti-rotation pins engage a proximal portion of said lower shaft to provide compliance with rough surfaces and further retain said lower and upper shaft centered and vertical;
a main support arm assembly, further comprising:
   a first support arm, having a proximal end and a distal end connected at a lower portion to said tubular upper guard and said tubular upper shaft of said guide arm assembly, further comprising a main support aperture;
   a second support arm having a distal end telescopically engaging said first support arm proximal end, further comprising a plurality of equidistantly spaced secondary apertures; and,
   an adjustment pin;
   wherein a desired length is achieved by aligning a desired one of said plurality of secondary apertures with said main support aperture; and,
   wherein said adjustment pin is routed through said desired one of said plurality of secondary apertures and said main support aperture to secure said desired length;
a support pole assembly adjustably attached to said positioning mechanism at an upper end and extending downwardly therefrom, further having a lower end removably affixed to a frame of said lawn mower, further comprising:
   a vertical support pole comprising external threads, having an upper portion and a lower portion;
   a mounting bracket removably mounting said vertical support pole lower portion to said frame of said lawn mower; and,
   a cap removably fastened to an end of said upper portion;
a control arm assembly, further comprising:
   an upper control arm;
   an operating handle attached to a proximal end of said upper control arm;
   a cable trigger located on an underside of said operating handle, pivotally connected to said operating handle with a pivot point; and,
   a control cable having a proximal end attached to and operably controlled by said cable trigger and a distal end;
   wherein said control cable is routed through an interior of said control arm assembly; and,
a positioning mechanism attached to a proximal end of said second support arm and to a distal end of said upper control arm at a diametrically opposing location from said second support arm, further comprising:
   an upper and a lower fastener removably and adjustably securing said positioning mechanism to said vertical support pole;
   a lower housing structure further having a lower bearing raceway;
   a middle housing structure having a first end attached to said upper control arm distal end and a second end attached to said second support arm;
   an azimuth control wheel, comprising a series of keyed slots;
   a pin guide located at said first end of said middle housing structure;
   a linear spring affixed to an inner wall of said middle housing structure first end;
   a locking pin affixed to a second end of said linear spring and traveling within said pin guide, said locking pin attached to and operably controlled by said control cable distal end;
   an upper housing structure further having an upper bearing raceway;
   a lower spacer positioned between said lower bearing raceway and said azimuth control wheel, thereby creating an lower fixed gap therebetween, said lower pacer contacting said vertical support pole; and,
   an upper spacer positioned between said upper bearing raceway and said azimuth control wheel, thereby creating an upper fixed gap therebetween, said upper spacer contacting said vertical support pole;
   wherein said vertical support pole is adjustably mounted to said positioning mechanism to a desired vertical position;
   wherein said upper and lower fastener secures said positioning mechanism at said desired vertical position;
   wherein said control cable motions said locking pin against said linear spring to engage said locking pin within a desired one of said series of keyed slots to secure said positioning mechanism at a desired position;
   wherein said control arm assembly operably controls said middle housing structure, thereby transferring directional control to said main support arm assembly; and,
   wherein said lower bearing raceway and said upper bearing raceway enable said middle housing structure rotate relative to said support pole assembly, said upper housing structure and said lower housing structure;
wherein said control arm assembly extends to a location adjacent to an operator of said lawn mower such that said operator can manipulate said control arm assembly;
wherein said support pole assembly resiliently supports said control arm assembly and said main support arm;
wherein said control arm assembly operably controls said cutting assembly via said positioning mechanism;
wherein said guide arm assembly provides shock absorbing and vibration dampening means to said cutting assembly; and,
wherein said pair of wheel assemblies contacts a ground surface when in operation and arcuately motions said cutting assembly when controlled by said control arm assembly.

15. The trimmer apparatus of claim 14, wherein said length adjustment means further comprises:
- a first support arm, having a proximal end and at a distal end attached to said guide arm assembly, further comprising a main support aperture;
- a second support arm having a distal end telescopically engaging said first support arm proximal end and a proximal end attached to said positioning mechanism, further comprising a plurality of equidistantly spaced secondary apertures; and,
- an adjustment pin;
- wherein a desired length is achieved by aligning a desired one of said plurality of secondary apertures with said main support aperture; and,
- wherein said adjustment pin is routed through said desired one of said plurality of secondary apertures and said main support aperture to secures said desired length.

16. The trimmer apparatus of claim 14, wherein said mounting bracket further comprises:
- an upper support surface, comprising a pair of mounting ears at a lower end of a pair of arms and an upper portion connecting an upper end of said pair of arms, further having a centrally disposed upper aperture;
- a lower support surface spanning a distance between and affixed to an intermediate location of said pair of arms, further comprising a lower aperture vertically aligned with said upper aperture; and,
- a pair of first fastening systems, each removably securing said vertical support pole to said mounting bracket;
- wherein said pair of first fastening systems enables removal of said trimmer apparatus from said frame of said lawn mower.

17. The trimmer apparatus of claim 15, wherein said cutting assembly further comprises a self-advancing string cutter.

18. The trimmer apparatus of claim 15, wherein said pair of wheel assemblies each further comprises a 360° caster wheel affixed to said lip of said body.

19. The trimmer apparatus of claim 15, wherein said upper spacer and said lower spacer each comprise a rubber construction.

20. The trimmer apparatus of claim 15, wherein said electrical connection cable is routed through at least said guide arm, said main support arm, and said positioning mechanism.

* * * * *